United States Patent
Huang et al.

(10) Patent No.: US 8,248,714 B2
(45) Date of Patent: Aug. 21, 2012

(54) PROJECTION LENS SYSTEM WITH HIGH RESOLUTION AND COMPACT SIZE

(75) Inventors: Hai-Jo Huang, Taipei Hsien (TW);
Fang-Ying Peng, Taipei Hsien (TW);
Sheng-An Wang, Taipei Hsien (TW);
Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 67 days.

(21) Appl. No.: 12/965,835

(22) Filed: Dec. 11, 2010

(65) Prior Publication Data

US 2012/0099210 A1   Apr. 26, 2012

(30) Foreign Application Priority Data

Oct. 20, 2010   (CN) .......................... 2010 1 0513185

(51) Int. Cl.
*G02B 13/04* (2006.01)
*H04N 5/225* (2006.01)

(52) U.S. Cl. .......................... 359/753; 359/749; 348/340

(58) Field of Classification Search .................. 348/340; 359/649, 749, 753
See application file for complete search history.

(56) References Cited

U.S. PATENT DOCUMENTS

| | | | |
|---|---|---|---|
| 6,275,343 B1 * | 8/2001 | Takamoto et al. | 359/749 |
| 7,656,587 B2 * | 2/2010 | Hsu et al. | 359/650 |
| 7,929,217 B2 * | 4/2011 | Wang et al. | 359/649 |
| 2012/0063011 A1 * | 3/2012 | Suzuki | 359/753 |
| 2012/0075722 A1 * | 3/2012 | Yamamoto | 359/714 |

* cited by examiner

*Primary Examiner* — David N Spector
(74) *Attorney, Agent, or Firm* — Altis Law Group, Inc.

(57) ABSTRACT

The present disclosure relates to a projection lens system for a projector having a spatial light modulator (SLM). The projection lens system includes, in order from the magnified end to the minified end thereof, a first lens group with negative refraction power, a second lens group with positive refraction power, and a third lens group with positive refraction power. The projection lens system satisfies the following formulas: 3<TT/f<3.6, and 0.48<BFL/f; wherein, TT is the overall length of the projection lens system; f is an effective focal length of the projection lens system; BFL is the back focal length of the projection lens system, the back focal length is equal to the distance between the third lens group and the SLM.

13 Claims, 7 Drawing Sheets

PROJECTION LENS SYSTEM WITH HIGH RESOLUTION AND COMPACT SIZE

BACKGROUND

1. Technical Field

The present disclosure relates to projection lenses and, particularly, to a projection lens system providing high resolution with reduced overall length.

2. Description of Related Art

In order to obtain a clear projection image and reduce the size of projectors, such as, digital light processing (DLP) projectors, liquid crystal display (LCD) projectors, and liquid crystal on silicon (LCoS) projectors, projection lens systems with high resolution and short overall length are needed. But factors affecting both the resolution and the overall length of the projection lens system, such as the number and position of lenses employed, the refraction power distributions of the employed lenses, and the shape of the employed lenses, are complicated. For example, reducing the number of lenses can shorten the overall length of the projection lens system, but resolution of the projection lens system will suffer; conversely, increasing the number of lenses of the projection lens system can increase resolution of the projection lens system, but the overall length of the projection lens system is increased.

What is needed, therefore, is a projection lens system to overcome or at least alleviate the above problems.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present disclosure.

DETAILED DESCRIPTION

Embodiments of the present disclosure will now be described in detail below, with reference to the accompanying drawings.

Figure 1:
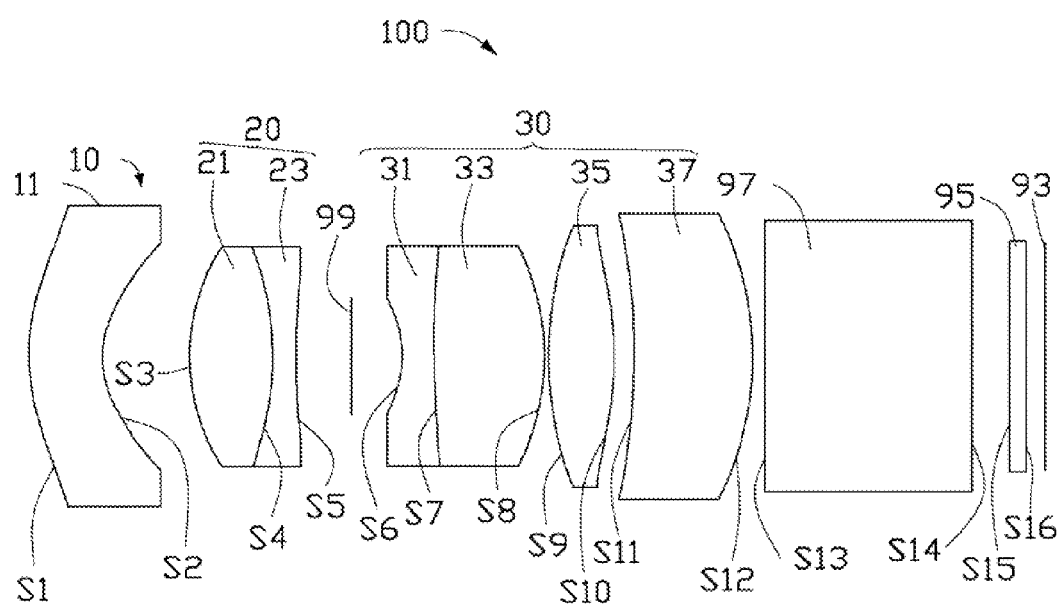
FIG. 1 is a schematic view of a projection lens system according to the present disclosure.

Referring to FIG. 1, a projection lens system 100 of the present disclosure is shown. The projection lens system 100 includes, in order from the magnified end to the minified end, a first lens group 10 with negative refraction power, a second lens group 20 with positive refraction power, and a third lens group 30 with positive refraction power. The first lens group 10 having negative refraction power, the second lens group 20 having positive refraction power, and the third lens group 30 having positive refraction power are configured to obtain a wide-angle projection ability to achieve a larger projected image in a limited space.

In the present embodiment, the projection lens system 100 is utilized in a DLP projector. A spatial light modulator (SLM) 93, for example, a digital micromirror device (DMD), modulates light signals for projection through the projection lens system 100. The light signals are transmitted through the third lens group 30, the second lens group 20, and the first lens group 10 in sequence, and then projected onto a projection surface (not shown) to produce images.

In the present embodiment, the first lens group 10 includes at least one first lens 11 having negative refraction power. In order from the magnified end to the minified end, the first lens 11 includes a first surface S1 and a second surface S2. The first surface S1 and the second surface S2 are aspherical surfaces.

The second lens group 20 includes, in order from the magnified end to the minified end, a second lens 21 having positive refraction power and a third lens 23 having negative refraction power. In the present embodiment, the second lens 21 and the third lens 23 are adhered together to form a single unit. The second lens 21 includes a third surface S3 and a fourth surface S4, and the third lens 23 includes the fourth surface S4 and a fifth surface S5 from the magnified end to the minified end.

The third lens group 30 includes, in order from the magnified end to the minified end, a fourth lens 31 having negative refraction power, a fifth lens 33 having positive refraction power, a sixth lens 35 having negative refraction power, and a seventh lens 37 having positive refraction power. In the present embodiment, the fourth lens 31 and the fifth lens 33 are adhered together to form a single unit. The fourth lens 31 includes a sixth surface S6 and a seventh surface S7, the fifth lens 33 includes the seventh surface S7 and an eighth surface S8, the sixth lens 35 includes a ninth surface S9 and a tenth surface S10, the seventh lens 37 includes an eleventh surface S11 and a twelfth surface S12, from the magnified end to the minified end. In the present embodiment, the ninth surface S9 and the tenth surface S10 are aspherical surfaces.

The above aspherical surfaces are shaped according to the formula:

$$x = \frac{ch^2}{1+\sqrt{1-(k+1)c^2h^2}} + \sum A_i h^i$$

wherein h is a height from the optical axis of the projection lens system 100 to an aspherical surface, c is a vertex curvature, k is a conic constant, and Ai is i-th order correction coefficients of the aspheric surface.

Both the first lens group 10 and the second lens group 20 of the projection lens system 100 are made of glass, while one lens of the third lens group 30 is made of plastic. In one embodiment, the fifth lens 33 is made of plastic.

In order to obtain low distortion, good imaging quality and a compact configuration, the projection lens system 100 satisfies the following conditions:

$$3 < TT/f < 3.6; \text{ and} \quad (1)$$

$$0.48 < BFL/f; \quad (2)$$

wherein, TT is the overall length of the projection lens system 100, equaling to a distance between the first surface S1 of the first lens group 10 and a magnified-end surface of the SLM 93; f is an effective focal length of the projection lens system 100; BFL is the back focal length of the projection lens system 100, equaling to a distance between the twelfth surface S12 of the third lens group 30 and the magnified-end surface of the SLM 93.

Condition (1) controls the refraction powers of the first lens group 10, the second lens group 20, and the third lens group 30, to obtain a suitably reduced overall length of the projection lens system 100 and to control aberrations occurring therein within an acceptable range. TT/f<3.6 allows reduction of the overall length of the imaging lens system 100. However, shortening the overall length of the imaging lens system 100 can cause aberrations, especially spherical aberrations. Thus, TT/f>3 is added to limit aberrations within the acceptable range.

Condition (2) limits the back focal length of the projection lens system 100 to make other optical elements of the projector (e.g. a filter) installable between the third lens group 30 and the SLM 93.

In one embodiment, the projection lens system 100 further satisfies the following condition:

$$1.78 < |f_1/f_3| < 2.16, \quad (3)$$

wherein, $f_1$ is a focal length of the first lens group 10; $f_3$ is a focal length of the third lens group 30. Condition (3) satisfies a requirement for telecentric imaging at the minified end to obtain a clear projection image and controls the overall length of the projection lens system 100.

In one embodiment, the projection lens system 100 further satisfies the following condition:

$$0.88 < f_2/f_3 < 1.1, \quad (4)$$

wherein, $f_2$ is a focal length of the second lens group 20, $f_3$ is a focal length of the third lens group 30. Condition (4) can ensure an aberration balance between the second lens group 20 and the third lens group 30 to improve the projection performance of the projection lens system 100.

The projection lens system 100 further includes an aperture stop 99 installed between the second lens group 20 and the third lens group 30. The aperture stop 99 is for adjusting light flux from the third lens 30 to the second lens group 20. In addition, the aperture stop 99 facilitates uniform light transmission when light passes through the third lens 30 to correct coma aberrations of the projection lens system 100. To minimize the manufacture cost and the total length of the projection lens system 100, the aperture stop 99 can be obtained by smearing an opaque material on an outer rim of the sixth surface S6 of the third lens group 30. The projection lens system 100 further includes a prism 97 and a glass filter 95 installed between the third lens group 30 and the SLM 93 for adjusting the light path and protecting the surface of the SLM 93.

The following symbols are used.

$F_{No}$: F number;
2ω: field angle;
R: radius of curvature;
d: distance between surfaces on the optical axis of the projection lens system 100;
Nd: refractive index of lens; and
Vd: Abbe constant.

Tables 1 and 2 show specifications of a first embodiment of the projection lens system 100, wherein TT=42.66 mm; f=12.62 mm; BFL=7.27 mm; $f_1$=−19.39 mm; $f_2$=10 mm; $f_3$=10.05 mm; $F_{No}$=2.0; 2ω=41.65°.

TABLE 1

| Surface | R(mm) | d(mm) | Nd | Vd |
|---|---|---|---|---|
| S1 | 8.1 | 3.12 | 1.58 | 59.5 |
| S2 | 4.05 | 3.68 | — | — |
| S3 | 8.55 | 3.49 | 1.91 | 35.3 |
| S4 | −12.78 | 1 | 1.76 | 26.5 |
| S5 | 35.38 | 2.33 | — | — |

TABLE 1-continued

| Surface | R(mm) | d(mm) | Nd | Vd |
|---|---|---|---|---|
| 99 | infinite | 2.14 | — | — |
| S6 | −5.04 | 1.35 | 1.85 | 23.8 |
| S7 | 54.2 | 4.65 | 1.83 | 42.7 |
| S8 | −10.3 | 0.2 | — | — |
| S9 | 16.1 | 2.76 | 1.53 | 55.8 |
| S10 | −13.49 | 0.84 | — | — |
| S11 | −28.34 | 5 | 1.59 | 61.1 |
| S12 | −13.18 | 0.5 | — | — |
| S13 | infinite | 10 | 1.85 | 23.8 |
| S14 | infinite | 0.8 | — | — |
| S15 | infinite | 0.7 | 1.52 | 64.2 |
| S16 | infinite | 0.1 | — | — |
| Magnified-end surface of the SLM 93 | infinite | — | — | — |

TABLE 2

| Surface | Aspherical coefficient |
|---|---|
| S1 | K = 0; A4 = −7.66081E−004; A6 = 1.72169E−006; A8 = −3.29692E−007; A10 = 1.27343E−008; A12 = −2.44798E−010; A14 = 1.70699E−012; A16 = 2.021868E−015 |
| S2 | K = −0.46; A4 = −1.82055E−003; A6 = −6.52424E−006; A8 = −1.10542E−006; A10 = −3.41625E−009; A12 = 1.727623E−009; A14 = −6.021E−011; A16 = −2.24487E−013 |
| S9 | K = −0.03; A4 = −6.6578E−005; A6 = 1.01189E−005; A8 = −2.352E−007; A10 = −7.33748E−009; A12 = 6.629883E−010; A14 = −1.27953E−011; A16 = 6.737504E−014 |
| S10 | K = −0.05; A4 = 2.984451E−004; A6 = 7.142611E−006; A8 = 1.821979E−007; A10 = −2.683648E−008; A12 = 9.850979E−010; A14 = −1.03846E−011; A16 = −1.51582E−014 |

Figure 2:
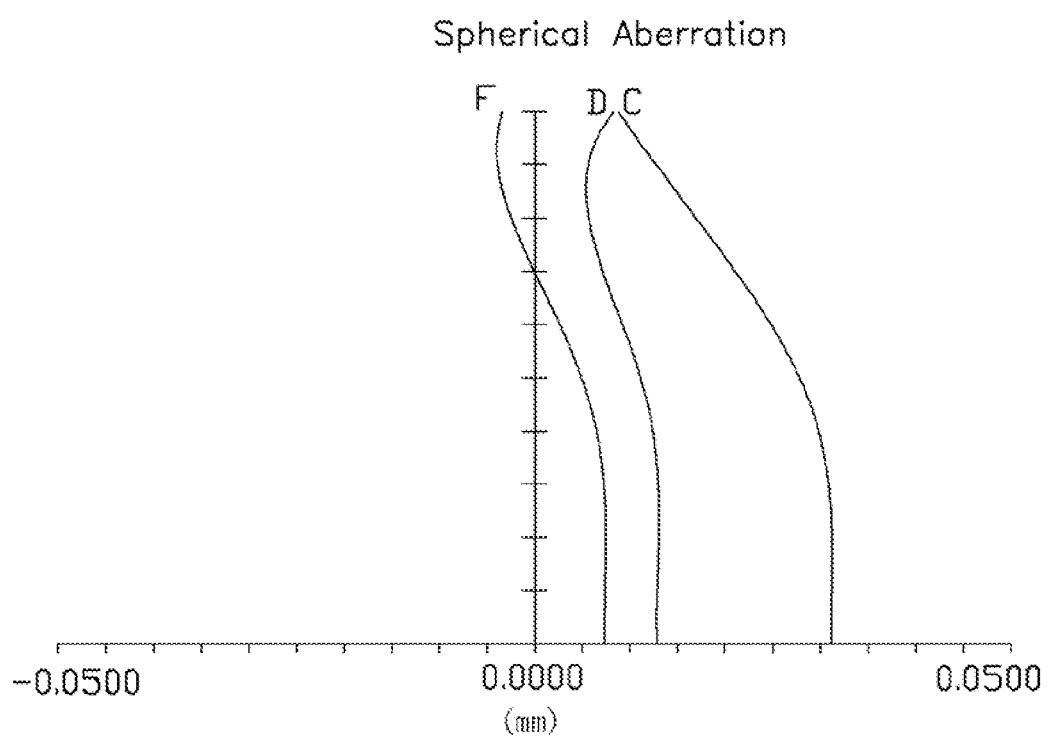
FIG. 2 is a spherical aberration diagram of the projection lens system according to a first embodiment.
Figure 3:
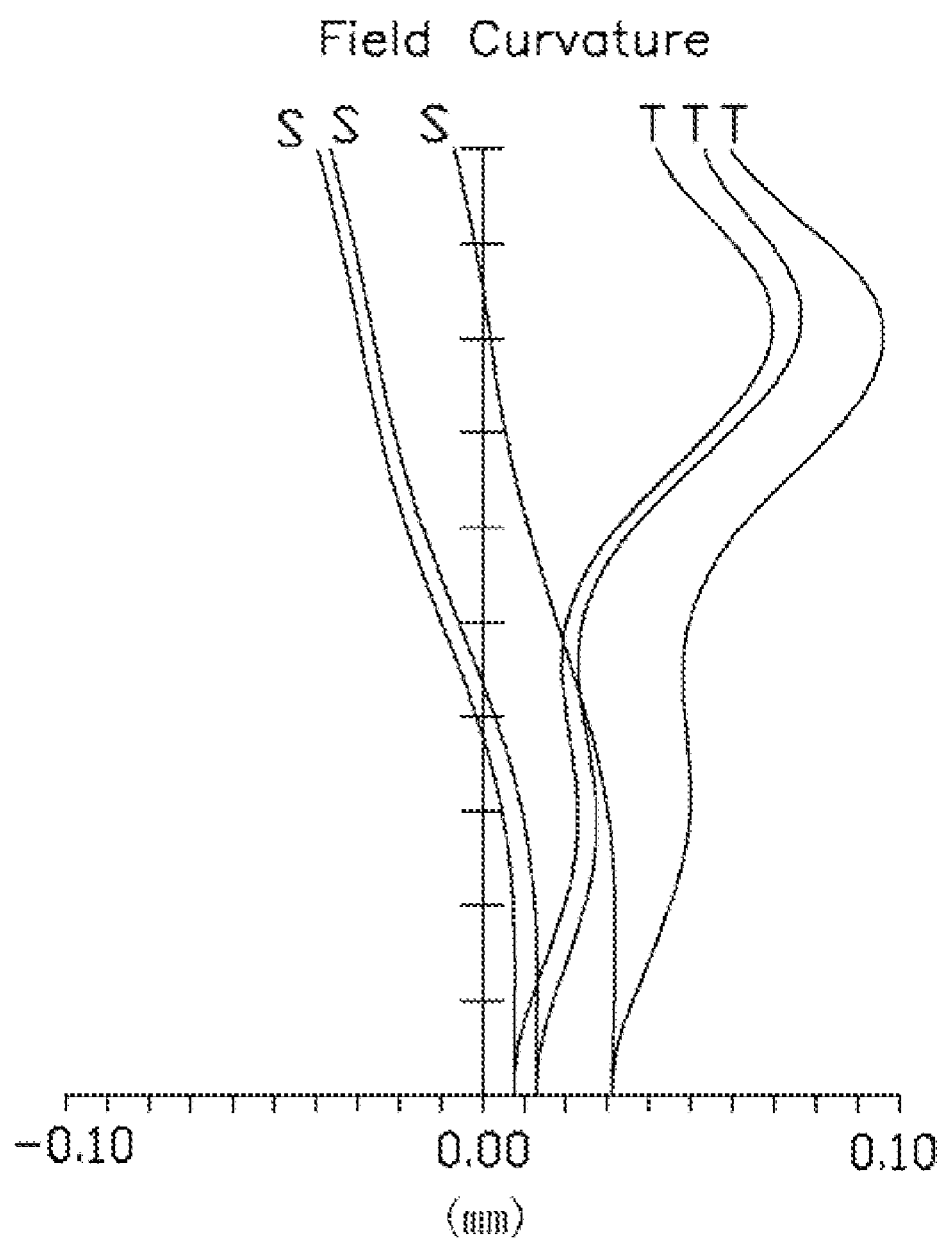
FIG. 3 is a field curvature diagram of the projection lens system according to the first embodiment.
Figure 4:
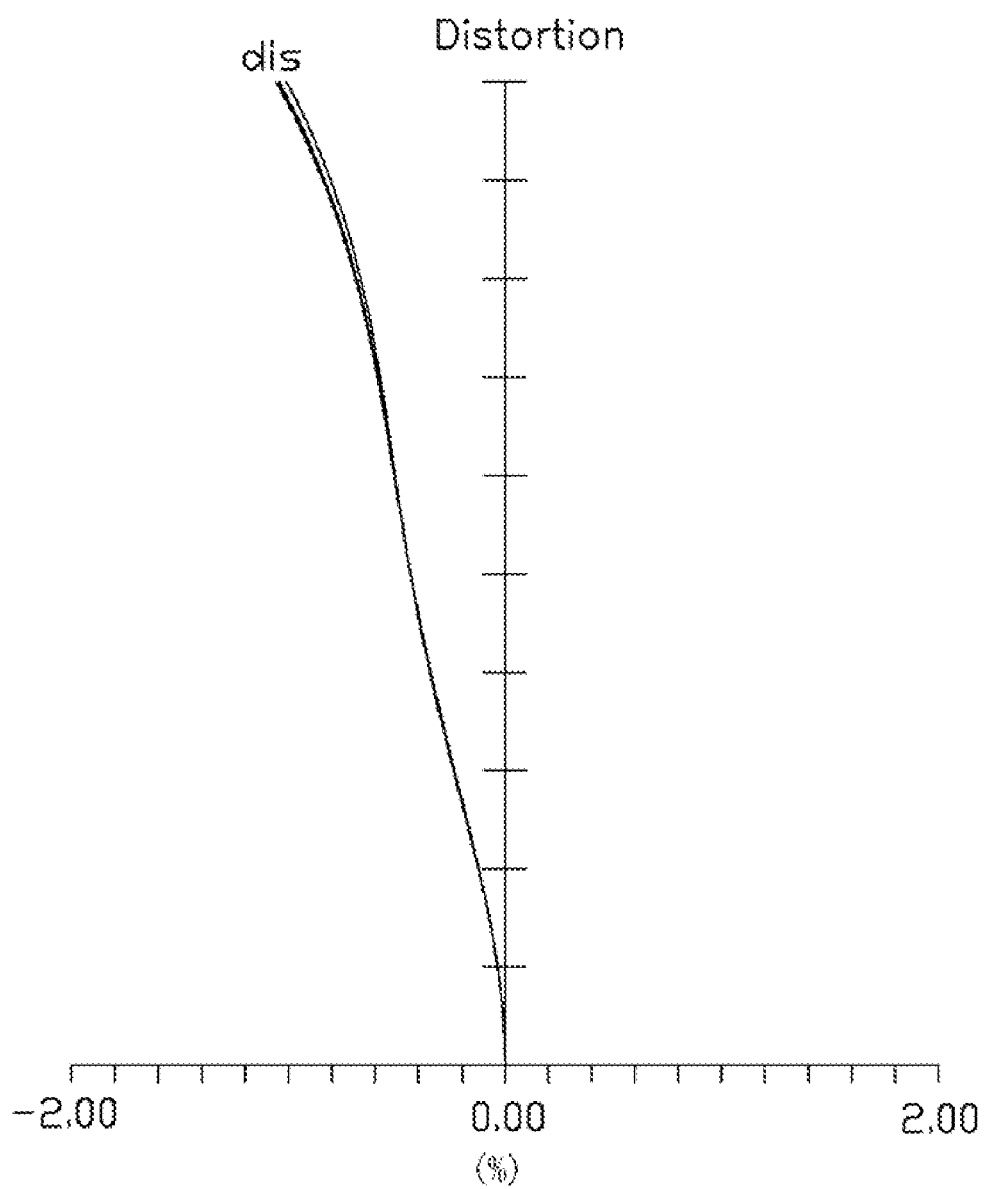
FIG. 4 is a distortion diagram of the projection lens system according to the first embodiment.

As illustrated in FIG. 2, curves F, D, and C are respectively spherical aberration characteristic curves of F light (wavelength: 486 nm), D light (587 nm), and C light (656 nm) of the projection lens system 100 of the first embodiment. The spherical aberration of the projection lens system 100 of the first embodiment is from −0.05 mm to 0.05 mm. In FIG. 3, the curves T and S are respectively a tangential field curvature curve and a sagittal field curvature curve. The field curvature of the projection lens system 100 of the first embodiment is from −0.1 mm to 0.1 mm. In FIG. 4, the distortion of the projection lens system 100 of the first embodiment is from −2% to 2%.

In the first Embodiment, though the overall length of the projection lens system 100 is reduced, aberrations of the projection lens system 100 are maintained within an acceptable range. That is, the projection lens system 100 keeps chromatic aberrations at a minimum while reducing the total length of the projection lens system 100.

Tables 3 and 4 show specifications of a second embodiment of the projection lens system 100, wherein TT=40.07 mm; f=12.48 mm; BFL=6.17 mm; f1=−19.71 mm; f2=9.67 mm; f3=9.83 mm; $F_{No}$=2.0; 2ω=42.07°.

TABLE 3

| Surface | R(mm) | d(mm) | Nd | Vd |
|---|---|---|---|---|
| S1 | 7.884 | 2.971 | 1.58 | 59.5 |
| S2 | 4.027 | 3.68 | — | — |

TABLE 3-continued

| Surface | R(mm) | d(mm) | Nd | Vd |
|---|---|---|---|---|
| S3 | 8.749 | 3.49 | 1.91 | 35.3 |
| S4 | −9.503 | 1 | 1.76 | 26.5 |
| S5 | 42.376 | 2.33 | — | — |
| 99 | infinite | 2.14 | — | — |
| S6 | −4.444 | 1.35 | 1.85 | 23.8 |
| S7 | −12.501 | 3.77 | 1.5 | 81.6 |
| S8 | −5.939 | 0.2 | — | — |
| S9 | 11.254 | 2.76 | 1.53 | 55.8 |
| S10 | −15.131 | 0.84 | — | — |
| S11 | −11.331 | 4.543 | 1.59 | 61.1 |
| S12 | −9.825 | 0.1 | — | — |
| S13 | infinite | 10 | 1.85 | 23.8 |
| S14 | infinite | 0.1 | — | — |
| S15 | infinite | 0.7 | 1.52 | 64.2 |
| S16 | infinite | 0.1 | — | — |
| Magnified-end surface of the SLM 93 | infinite | — | — | — |

TABLE 4

| Surface | Aspherical coefficient |
|---|---|
| S1 | K = 0;<br>A4 = −9.08237E−004; A6 = 1.967866E−006;<br>A8 = −3.29692E−007; A10 = 1.27343E−008;<br>A12 = −2.44798E−010; A14 = 1.70699E−012;<br>A16 = 2.021868E−015 |
| S2 | K = −0.46;<br>A4 = −2.06132E−003; A6 = −1.91837E−006;<br>A8 = −1.10542E−006; A10 = −3.41625E−009;<br>A12 = 1.727623E−009; A14 = −6.021E−011;<br>A16 = −2.24487E−013 |
| S9 | K = −0.03;<br>A4 = 2.623017E−005; A6 = 1.262254E−005;<br>A8 = −2.352E−007; A10 = −7.33748E−009;<br>A12 = 6.629883E−010; A14 = −1.27953E−011;<br>A16 = 6.737504E−014 |
| S10 | K = −0.05;<br>A4 = 5.837792E−004; A6 = 1.222744E−005;<br>A8 = 1.821979E−007; A10 = −2.683648E−008;<br>A12 = 9.850979E−010; A14 = −1.03846E−011;<br>A16 = −1.51582E−014 |

Figure 5:
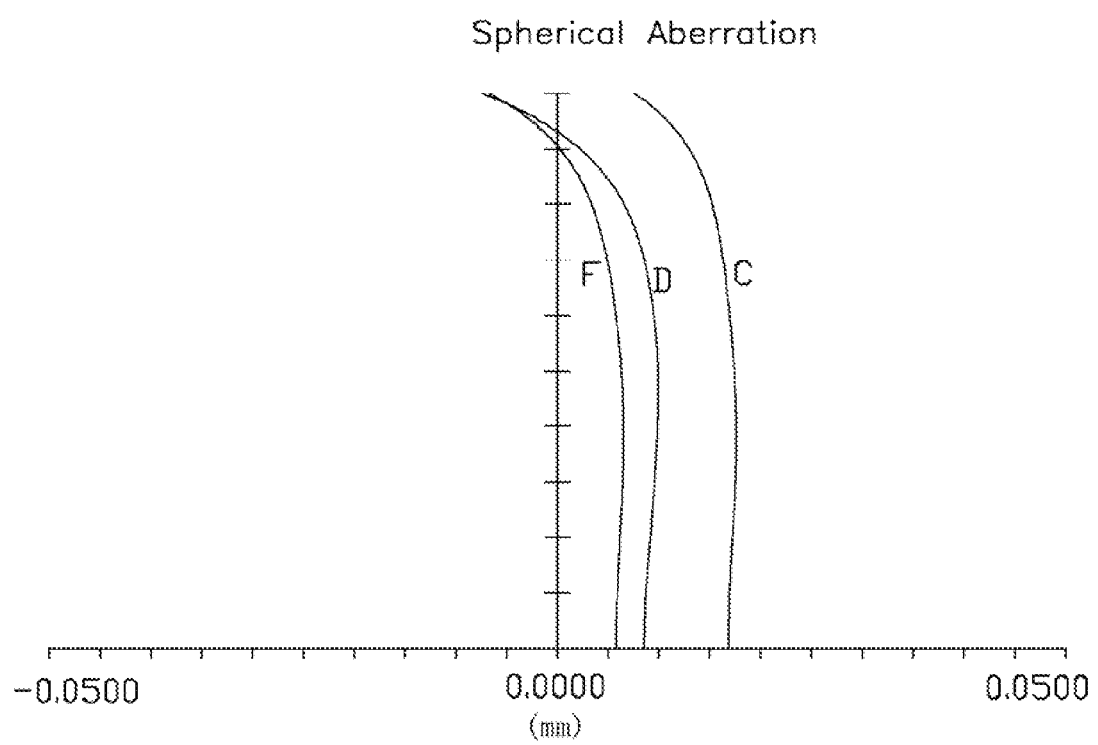
FIG. 5 is a spherical aberration diagram of the projection lens system according to a second embodiment.
Figure 6:
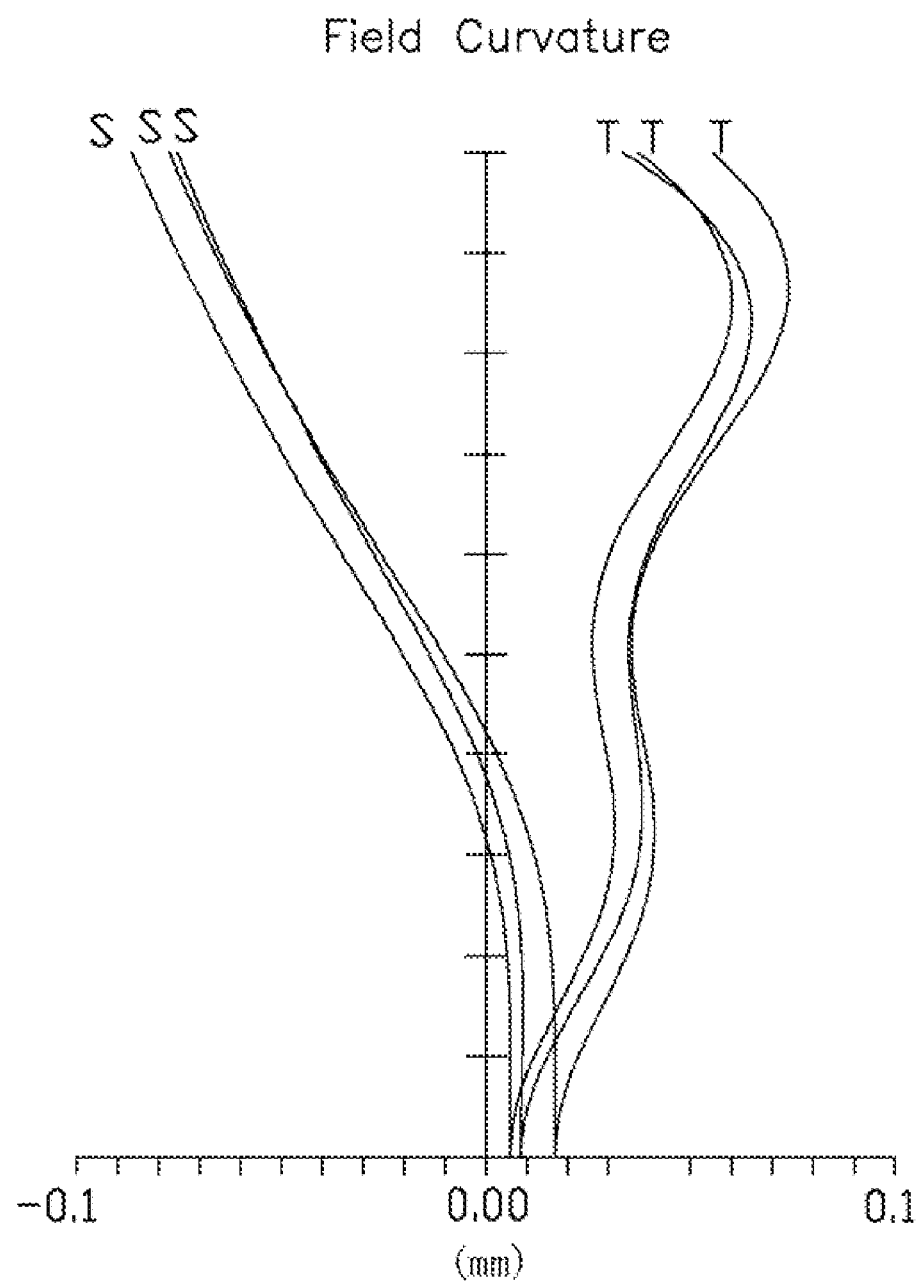
FIG. 6 is a field curvature diagram of the projection lens system according to the second embodiment.
Figure 7:
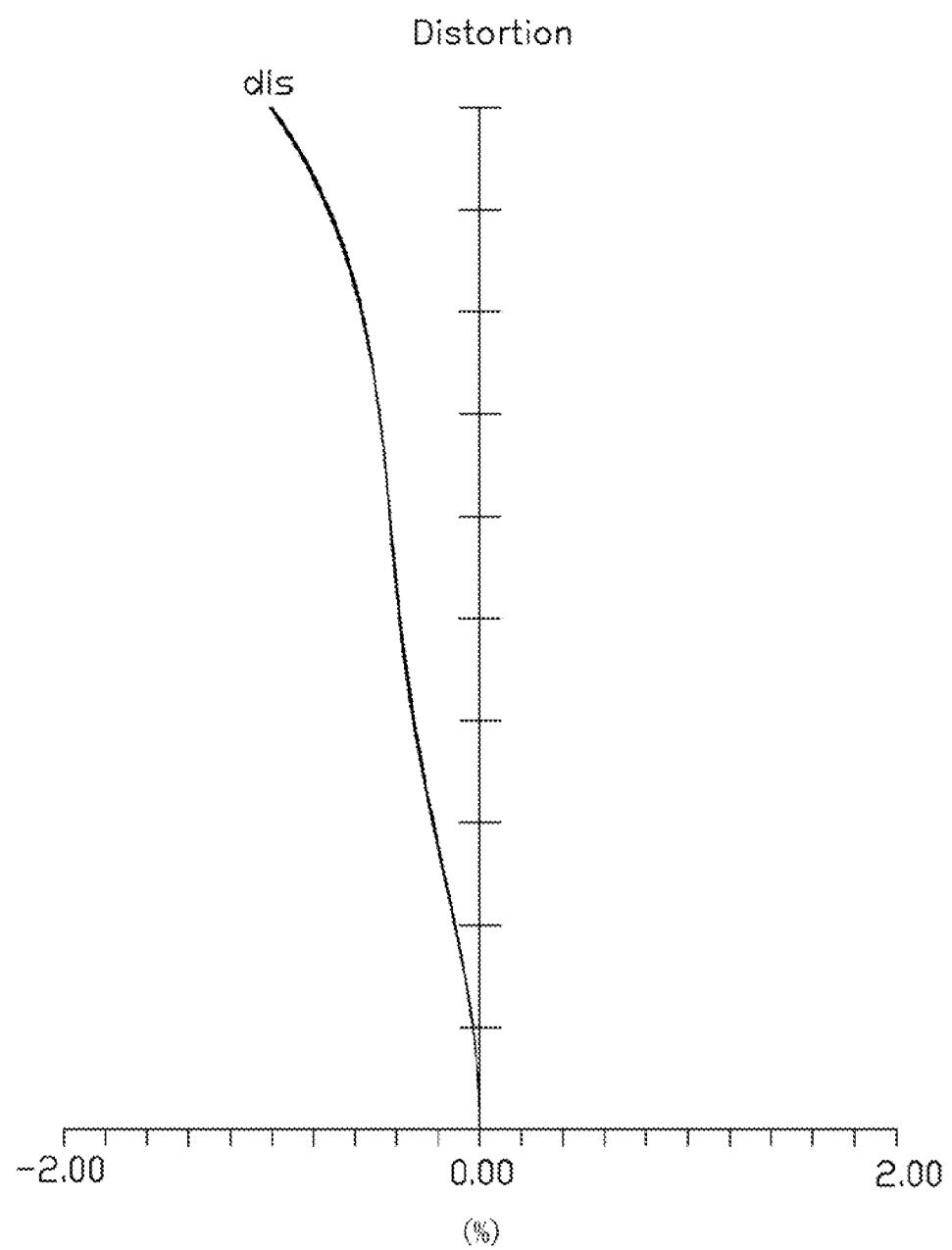
FIG. 7 is a distortion diagram of the projection lens system according to the second embodiment.

As illustrated in FIG. 5, curves F, D, and C are respectively spherical aberration characteristic curves of F light (wavelength: 486 nm), D light (587 nm), and C light (656 nm) of the projection lens system 100 of the second embodiment. The spherical aberration of projection lens system 100 of the second embodiment is from −0.02 mm to 0.02 mm. In FIG. 6, the curves T and S are respectively a tangential field curvature curve and a sagittal field curvature curve. The field curvature of the projection lens system 100 of the second embodiment is from −0.1 mm to 0.1 mm. In FIG. 7, the distortion of the projection lens system 100 of the second embodiment is from −2% to 2%.

In the second embodiment, though the overall length of the projection lens system 100 is reduced, aberrations of the projection lens system 100 are maintained within an acceptable range. That is, the projection lens system 100 can keep chromatic aberrations at a minimum while reducing the total length of the projection lens system 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A projection lens system for a projector having a spatial light modulator (SLM), in order from the magnified end to the minified end thereof, comprising:
a first lens group with negative refraction power;
a second lens group with positive refraction power; and
a third lens group with positive refraction power;
wherein the projection lens system satisfies the following formulas:

$$3 < TT/f < 3.6, \text{ and}$$

$$0.48 < BFL/f;$$

where, TT is the overall length of the projection lens system; f is an effective focal length of the projection lens system; BFL is the back focal length of the projection lens system, the back focal length is equal to the distance between the third lens group and the SLM.

2. The projection lens system of claim 1, wherein the projection lens system further satisfies the formula: $1.78 < |f_1/f_3| < 2.16$, wherein, $f_1$ is a focal length of the first lens group; $f_3$ is a focal length of the third lens group.

3. The projection lens system of claim 1, wherein the projection lens system further satisfies the formula: $0.88 < f_2/f_3 < 1.1$, wherein, $f_2$ is a focal length of the second lens group, $f_3$ is a focal length of the third lens group.

4. The projection lens system of claim 1, further comprising an aperture stop interposed between the second lens group and the third lens group.

5. The projection lens system of claim 1, wherein the projection lens system further comprises a prism and a glass filter positioned between the third lens group and the minified end.

6. The projection lens system of claim 1, wherein the second lens group comprises, in order from the magnified end to the minified end, a second lens having positive refraction power, and a third lens having negative refraction power.

7. The projection lens system of claim 1, wherein both of the first lens group and the second lens group are made of glass, while one lens of the third lens group is made of plastic.

8. The projection lens system of claim 1, wherein the first lens group comprises a first lens having negative refraction power.

9. The projection lens system of claim 8, wherein the first lens comprises, in order from the magnified end to the minified end, a first surface and a second surface, the first surface and the second surface are aspherical surfaces.

10. The projection lens system of claim 1, wherein the third lens group comprises, in order from the magnified end to the minified end, a fourth lens having negative refraction power, a fifth lens having positive refraction power, a sixth lens having negative refraction power, and a seventh lens having positive refraction power.

11. The projection lens system of claim 10, wherein the fourth lens and the fifth lens are adhered together to form a single unit.

12. The projection lens system of claim 10, wherein the sixth lens comprises a ninth surface and a tenth surface, the ninth surface and the tenth surface are aspherical surfaces.

13. The projection lens system of claim 10, wherein the seventh lens comprises an eleventh surface and a twelfth surface from the magnified end to the minified end, the back focal length is equal to the distance between the twelfth surface and a magnified-end surface of the SLM.

* * * * *